Jan. 13, 1931.  F. N. TUCKER  1,788,499
CONDENSER
Filed Nov. 22, 1926
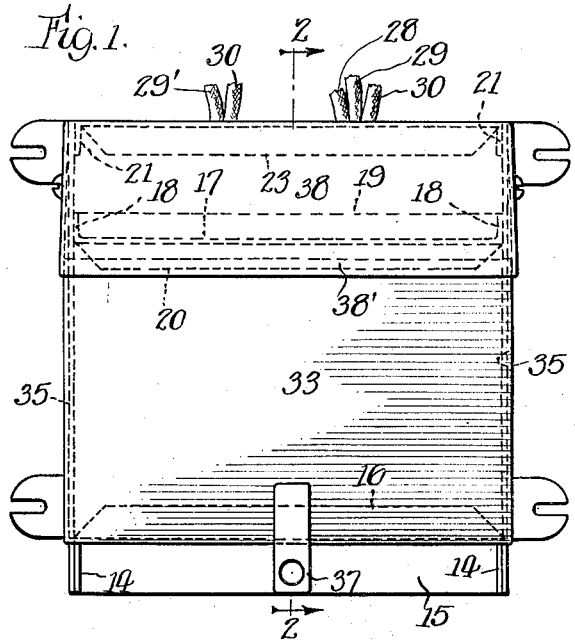
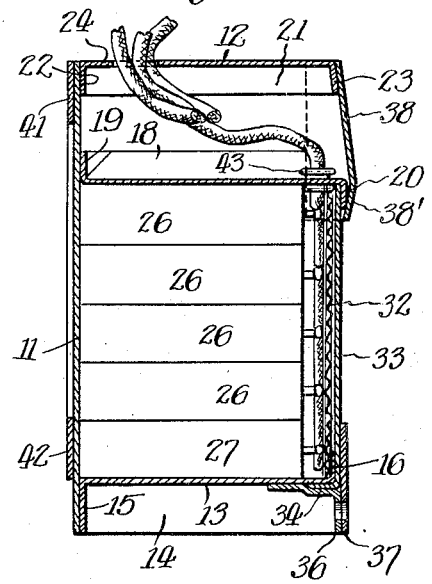
Inventor:
Frank N. Tucker,
By Fisher, Towle, Clapp & Soans,
Attys.

Patented Jan. 13, 1931

1,788,499

UNITED STATES PATENT OFFICE

FRANK N. TUCKER, OF NEW YORK, N. Y., ASSIGNOR TO ILG ELECTRIC VENTILATING COMPANY, OF CHICAGO, ILLINOIS, A CORPORATION OF LOUISIANA

CONDENSER

Application filed November 22, 1926. Serial No. 149,806.

This invention relates to improvements in electrical condensers and, in its chief intended application, is designed to connect a multi-phase motor onto a single-phase circuit, serving as a static phase converter.

The principal object of the invention is to provide an improved condenser box or receptacle, including a cell chamber in which the condenser cells may be conveniently housed in any desired number up to the full capacity of the chamber and may be grouped conveniently for connection to the circuit lines, and a wiring chamber, in combination with removable closure plates for the cell chamber and wiring chamber, and means for locking the cover plate of the cell chamber in place.

Other objects and attendant advantages of the invention will be apparent to persons skilled in the art as the same becomes better understood by reference to the following detailed description, taken in connection with the accompanying drawing in which I have illustrated a practical and approved embodiment of the invention, and wherein—

Fig. 1 is a front elevation of my improved condenser;

Fig. 2 is a transverse vertical section on the line 2—2 of Fig. 1;

Fig. 3 is a front elevation with the cover plates of the cell chamber and the wiring chamber removed; and Fig. 4 is a top plan.

Referring to the drawings, the cell container consists of a rectangular box preferably of sheet-metal and comprising side walls 10, a rear wall 11, a top wall 12, and a bottom wall 13. Said bottom wall is located slightly above the lower edges of the side and rear walls and is provided on its side and rear edges with downturned flanges 14 and 15, respectively, which are soldered, welded or otherwise secured to the side and rear walls of the box, and on its front edge with an upturned flange or lip 16. At a point between the top and bottom walls 12 and 13 the box is provided with a horizontal partition plate 17 equipped on its side and rear edges with upstanding flanges 18 and 19 respectively soldered, welded or otherwise secured to the side and rear walls of the box, and on its front edge with a downturned flange or lip 20. The partition 17 divides the interior of the box into a lower cell chamber and an upper wiring chamber. The top wall 12 is formed with downturned side and rear flanges 21 and 22 soldered, welded or otherwise secured to the side and rear walls of the box, and on its front end with a down-turned flange 23. The top wall 12 is formed with apertures 24 and 25 through which the circuit leads enter the wiring chamber.

Within the lower cell chamber are disposed in vertical and transverse rows the rectangular condenser cells 26. Since these cells are of such dimensions that a given number of them, arranged in horizontal and vertical rows, will completely fill the cell chamber, variations in the number of cells used, up to the full capacity of the cell chamber, may readily be effected by the substitution of dummies consisting of wooden blocks 27 each having the dimensions of a single cell, so that the cell chamber will at all times be loaded and all tendency toward displacement and consequent strain on the cell terminals during handling of the box will be avoided.

The particular wiring of the cells is immaterial to the present invention, but I have herein shown two circuit leads 28 and 29 entering the wiring chamber through the opening 24 in the top and connected to opposite terminals of the cells, respectively, said leads 28 and 29, where the condenser is connected to a three-phase motor, leading from the two phases of the latter, while 30 designates a lead from the third phase of the motor that may also enter the wiring chamber through the aperture 24. Through the aperture 25 are led the wire 30 and a wire 29' that is spliced on or otherwise connected into the wire 29 at 31. The outgoing leads 30 and 29', in the instance assumed, connect on to the single-phase line circuit wires through the usual switch (not shown).

From the foregoing it will be observed that the condenser cells are so arranged as to form a sectional condenser, so that, in case of accident, one or more cells can be removed, allowing the motor to operate on the reduced number of cells until new cells can be added.

Referring to the closure, the lips 16 and 20 of the bottom and partition walls overhang the front ends of the cells sufficiently to permit the passage therebehind of an insulating slide 32 which may be of wood, corrugated cardboard, or any other suitable material. 33 designates a removable cover plate for the cell chamber. In applying the same, the upper edge portion of said cover plate is passed behind the upper lip 20 between the latter and the insulating cover 32, as shown in Fig. 2; and the lower edge of said cover plate is preferably formed with an inwardly extending horizontal flange 34 which laps under the forward edge of the bottom plate 13. The side edges of said cover plate are formed with rearwardly extending flanges 35 which overlap the forward edge portions of the side plates 10, and said plate may be locked in place through the agency of a pair of lugs 36 and 37 secured respectively to the bottom plate 13 of the box and to the cover plate 33 containing registering apertures for the reception of a padlock or tie wire. The upper or wiring chamber is closed by a removable cover plate 38, the lower rearwardly bent marginal portion 38' of which overlaps the lip 20 of the partition plate, and the vertical edges of which are formed with rearwardly directed flanges 39 (Fig. 4) that may be attached to the side walls 10 by screws 40.

To the upper and lower edges of the rear wall 11 may be secured cross-bars or straps 41 and 42 projecting slightly beyond the side walls and slotted as shown at 41' and 42' for the reception of fastening screws; so that the condenser box may be readily attached to a wall or may rest on a horizontal support, or both.

The partition plate 17 is formed with openings preferably equipped with insulating sleeves or bushings 43 to accommodate the passage of the circuit leads 28 and 29 from the wiring chamber into the front portion of the cell chamber.

By reason of the above described construction, individual cells are readily removable and insertable either for repair purposes or for varying the capacity of the condenser by simply removing the front cover and insulating plate of the cell chamber. By removing the upper cover 38 of the wiring chamber, the wiring connections may readily be made through the open front end of said chamber. The entire structure is self-contained and may be readily shifted from one position to another or packed and transported without danger of injuring the cells or breaking the terminal connections through jolting and jarring. Finally, the structure readily adapts itself to economical manufacture through the use of sheet-metal subjected to simple punch press and welding operations.

I have herein shown and described a practical and workable embodiment of the invention, but it should be understood that the invention is not limited to the structural details shown and described, except to the extent clearly indicated in specific claims.

I claim—

1. A container for the condenser cells of a static phase converter, consisting of a rectangular sheet-metal box formed with an open front, a horizontal partition in said box dividing the same into an underlying cell chamber and an overlying wiring chamber, a downturned flange on the front edge of said partition extending across said open front, a closure plate for said cell chamber adapted at its upper edge to fit behind said flange, means for locking the lower edge of said plate to said box, and a closure plate for said wiring chamber adapted at its lower edge to overlap said flange and having at its ends rearwardly directed flanges overlapping and removably attached to the side walls of said box.

2. A container for the condenser cells of a static phase converter, consisting of a rectangular sheet-metal box formed with top, bottom, side and rear walls and an open front, a horizontal partition in said box dividing the same into an underlying cell chamber and an overlying wiring chamber, downturned flanges on the front edges of said top wall and partition extending across said open front, an upturned flange on the front edge of said bottom wall extending across said open front, an insulating plate covering the open front of said cell chamber and confined at its upper and lower edges behind the flanges of said partition and bottom wall, a closure plate for said cell chamber adapted at its upper edge to fit behind the flange of said partition, and itself formed with rearwardly directed flanges overlapping the side and bottom walls of said box, means for locking said closure plate to said box, and a closure plate for said wiring chamber adapted at its upper edge to overlie the flange of said top wall and at its lower edge to overlap the flange of said partition and having at its ends rearwardly directed flanges overlapping and removably attached to the side walls of said box.

FRANK N. TUCKER.